Aug. 15, 1967  E. H. BACHMANN  3,335,989
STAND FOR OPTICAL INSTRUMENTS
Filed June 1, 1965  2 Sheets-Sheet 1

Inventor
Emil Bachmann
By
Watson, Cole, Grindle & Watson
Attys.

Aug. 15, 1967  E. H. BACHMANN  3,335,989
STAND FOR OPTICAL INSTRUMENTS
Filed June 1, 1965  2 Sheets-Sheet 2

Inventor
Emil Bachmann
By
Watson, Cole, Grindle, Watson
Attys.

United States Patent Office 3,335,989
Patented Aug. 15, 1967

3,335,989
STAND FOR OPTICAL INSTRUMENTS
Emil Heinrich Bachmann, Schaffhauserstrasse 135,
Kloten, Zurich, Switzerland
Filed June 1, 1965, Ser. No. 460,284
Claims priority, application Switzerland, June 2, 1964,
7,202/64
11 Claims. (Cl. 248—158)

ABSTRACT OF THE DISCLOSURE

A stand for carrying an optical instrument or the like, having a rigid leg member and connecting means at the top of the leg member to connect the latter to an optical instrument to prevent angular movement with respect to the top of the leg member. A foot member is provided at the lower end of the leg member and this foot member has partially spherical surfaces contacting each other for relative movement and friction means to brake the optical instrument against unintentional angular movement with respect to the supporting surface.

---

Figure 1:
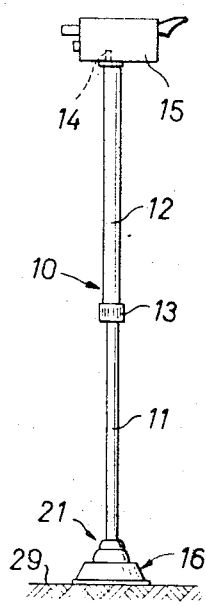

This invention relates to a stand or support for optical instruments, particularly small or narrow film cameras.

In addition to the usual heavy and actually cumbersome tripod supports for optical instruments, there are also single leg supports known which have at its lower or bottom end either a pointed or an essentially half spherical rubber buffer. In both cases there is present in use as to a single leg support, a small contact surface between the support leg and the base member on which the leg is supported. Therefore, the single leg is mounted on its support so that practically it can be rotated around its longitudinal axis without any resistive friction or hinderance. Also, certain known single leg supports of a plurality of telescoping parts permit free rotation as to its telescoping parts relative to each other. Therefore, the single leg supports for optical instruments as known heretofore possessed a certain stability against unintentional angular movement of the optical axis in the vertical direction but not in the horizontal direction.

It is an object of the present invention to mount an optical instrument on a stand so that it can be used with the stand having only a single leg to be supported on a surface by a foot portion and the optical instrument having a good stable mounting as to its optical axis. A further object resides in the provision of a structure to prevent unwanted swaying motion in the horizontal direction whereby, however, a desired rotation of a camera on a horizontal plane may be carried out for, for instance panorama picture-taking.

It is another object of the invention to provide a stand for optical instruments in which a leg of the stand has a foot member on its lower end and provided with outstretched support surfaces for contact on a surface. The foot is provided with means to prevent uncontrolled rotary movement around the longitudinal axis of the leg relative to the support surface. The foot support surfaces are so formed that the foot will not rotate on the surface such as a floor, street, etc. It is possible to provide a brake between the instrument and the upper part of the stand and also provide the foot with a brake device and thus a damped rotation of the upper part of the stand is possible but otherwise a rotation of the upper part of the stand does not take place.

Another object of the invention resides in the rotary possibility of the foot relative to the leg and also to provide angular adjustment of the leg in any desired direction. Another object of the invention resides in the provision of a ball and socket structure for the foot with a special formation of the ball and socket parts. Also friction means are provided in the ball and socket joint.

A still further object of the invention resides in the provision of a universal joint structure for the connection of the leg to the foot and also the specific structure of the foot itself.

Figure 3:
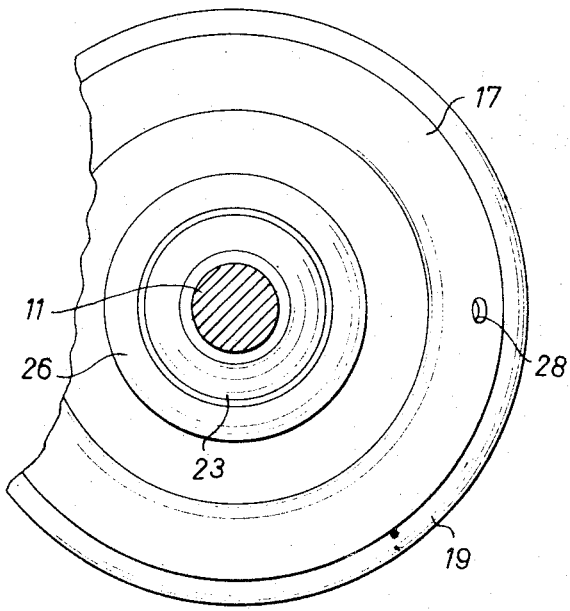
Figure 2:
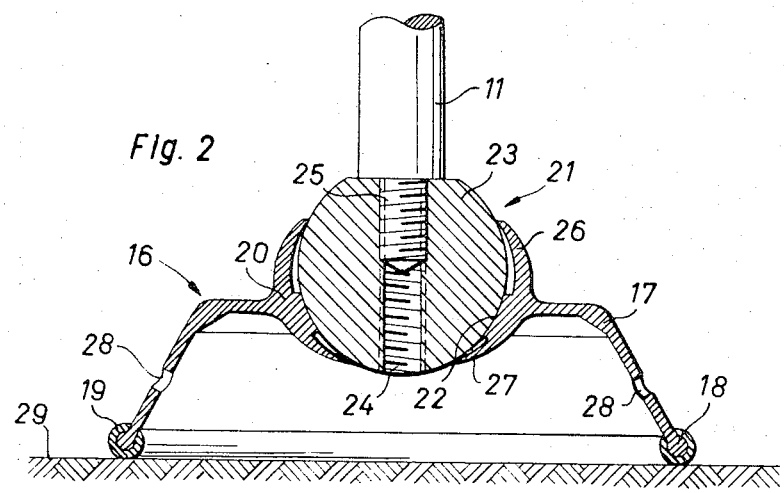
Figure 4:
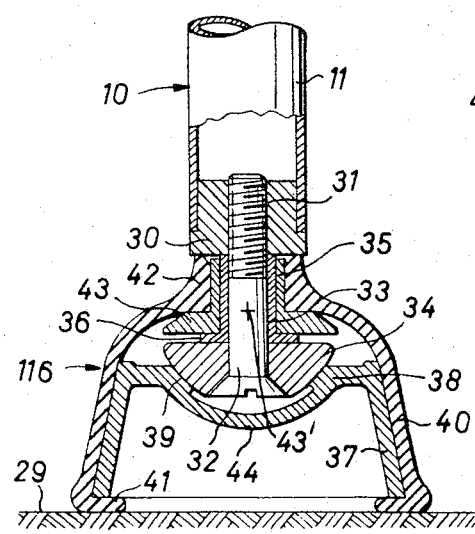
Figure 5:
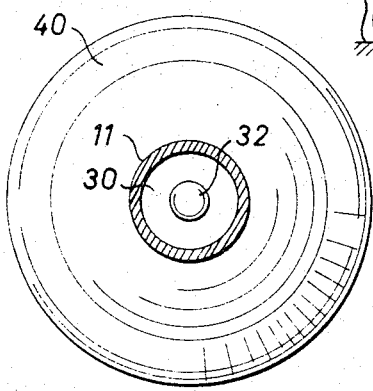
Figure 6:
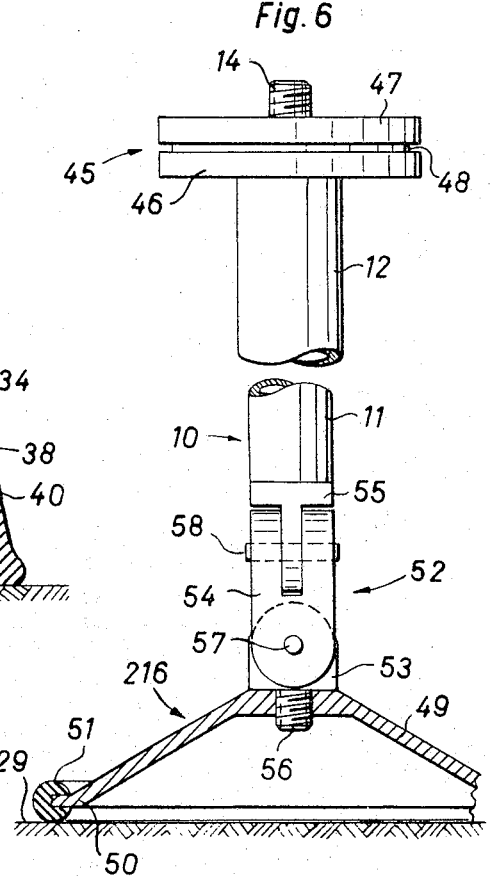
Figure 7:
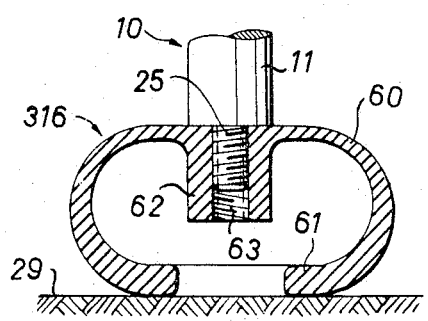

Further objects will be apparent from the following description when considered in connection with the accompanying drawings in which:

FIGURE 1 is a side elevation of a single stand or support on which a narrow film camera is mounted according to the invention, FIGURE 2 is a longitudinal sectional view showing the lower part of the stand of FIGURE 1 on a larger scale, FIGURE 3 is a top plan view of the lower part of the stand of FIGURE 2, FIGURE 4 is alongituddinal section of the lower part of the stand of a modified structure, FIGURE 5 is a top plan view of the stand of FIGURE 4, FIGURE 6 is a side elevation partly in section showing a third modification, and FIGURE 7 is a vertical cross section of the lower part of the stand showing a fourth modification.

The stand or support shown in FIGURES 1 to 3, there is illustrated two coaxially mounted profile elements 11 and 12, of which the lower profile element telescopically projects into the upper pipe element 12. By means of a clamping device 13, the two parts 11 and 12 can be held in any desired extended position, so that the parts 11 and 12 cannot rotate or are slidable relative to each other. The parts 11, 12 and 13 together form, in their longitudinal positions, an adjustable leg 10 which at its upper end has, for example, a supporting threaded portion 14 to which an optical instrument, for example a small film camera 15, may be mounted. It is not necessary to further described the foregoing parts.

On the lower end of the leg 10 there is provided what may be described as a bell-shaped foot 16 which according to FIGURES 2 and 3 is constructed as well be described as follows. The foot 16 is in the form a supporting bell 17 which is open at the bottom and has a peripheral bead portion 18 to increase the contact surface on a floor or support surface, as for example, the floor of a room, and this bead portion 18 receives a binding 19 of rubber or a similar substance. The peripheral bead or rim 18 and the binding 19 have a rather large diameter as compared with the diameter of the leg 10, so that the foot 16 will possess a relatively wide supporting surface to set up and contact the floor or pavement 29. The upper part 20 of the supporting bell 17 is formed as a universal joint 21 in the form of a ball member 23 having a screw-threaded socket 24 therein and is connected to a pin 25 connected on the lower end of the leg 11. The pin 25 is also provided with screw-threads to mesh with the internal screw-threads 24 in the ball member 23. The parts are thus connected to the leg 11 by means of the threaded socket 24 to mesh with the screw-threads 25. The socket member 20 has an upper and a lower ring-shaped lip or collar 26 and 27 respectively which exert an elastic force on the outer surface of the ball member 23, so that such lips will prevent foreign matter to penetrate into the seat surface 22 for the part 20. The upper lip 26 is also provided for the purpose of preventing the separation of the ball member 23 out of the socket member 22 and also the upper lip 26 creates a frictional contact between the ball 23 and the socket member 20. The support bell 17 is provided with at least one small opening 28 to prevent a build-up of a vacuum in the bell 17.

The support bell 17 is preferably made from any artificial material as for example a polyethylene, polyfluoroethylene or polyvinylchloride, etc., whereas the ball member 23 may be made from a metal, such as for example aluminum with an anodized outer surface. Due to the good sliding characteristics of the metal on the artificial plastic material it is not necessary to oil or grease the surfaces, even when a relative movement takes place with some frictional resistance.

In the use of this single support, the foot 16 by means of the rubber frame or binding 19, is placed on the base surface 29 and thus the leg 10 is supported on the surface 29 by means of the foot 16. Thus the ring-shaped contact surface is of relatively large diameter between the foot 16 and the floor 29 and the rubber binding 19 will tend to prevent rotation of the foot on the surface 29. The camera 15 mounted on the leg 10 by screw-threads at 14, can be rotated together with the leg in a horizontal direction, whereby the ball joint member 23 can rotate in the socket member 20. Due to the weight of the leg 10 and the instrument 15 mounted thereon, if necessary strengthened by human effort downwardly on the instrument 15, there will result a frictional resistance between the ball and socket joint, so that a quick rotation does not take place. The optical axis of the camera 15 is thus stabilized in a horizontal direction similar to a tripod support with a panorama head. This was not possible as to known mechanism since in such known structure there was no possibility of rotation in a horizontal plane and no frictional resistance was possible heretofore.

Unintentional swaying of the optical axis of the camera 15 in known one leg supports, was due to the fact that the leg and the securing means of the camera prevented a rigid fastening. The ball and socket joint 21 on the foot 16 permits the inclination of the leg 10 to any desired direction relative to the surface 29, as for example, to adjust the optical axis of the camera at an angle downwardly. By means of the ball and socket joint 21 it is also possible by vertical positioning of the leg 10, to place the foot on an angular surface as to the entire binding or edge 18 and its rim 19.

As shown in FIGURE 2, the thin-walled construction of the bell-shaped base 17 has also the advantage to fit such base on uneven surfaces 29 and also in such case upon an undesired rotation of the foot there is no hinderance of the supporting effect for the binding edge rim 19. The bell-shaped casing 17 will permit a certain elastic movement of the support in the vertical direction, whereby the optical instrument 15 will be protected against hard knocks when setting up the support on the surface 29.

FIGURES 4 and 5 illustrate a second modification in which the lower telescoping section 11 of the leg 10 and the foot portion 16 are constructed in a modified form. The leg part 11 is a tube in which a plug or pin 30 is secured in the end of the tube and this plug is coaxial with the axis of the tube and has a threaded bore 31 therein. A threaded end of a screw or bolt 32 meshes with the threads in the bore 31 and with the aid of the screw 32 there is secured a collar-shaped bearing member 33 and a semi-spherical ball member 34, on the end of the tube 11 by means of the plug 30. The bearing member 33 is between the semi-ball member 34 and the plug 30. The bearing member 33 is surrounded by a rotatable case or socket 35 and is provided with an outwardly projecting flange 36 to prevent axial movement downwardly against the semi-ball member 34. A supporting partial globe base member 37 is provided in its top surface with a semi-spherical depression 39 to receive the semi-ball member 34. The member 34 and the semi-socket member 38 form together the ball and socket joint. As in the first example, the bell-shaped member 37 is preferably made of a plastic material or from an artificial composition.

A casing jacket 40 which covers the member 37 and the ball and socket joint 34 and 38, is composed of a rubber or other elastic material, with the jacket 40 having a bell shape and is provided at the bottom part with an inwardly projecting flange 41 which receives the lower edge of the member 37. At the top of the jacket 40 there is provided a neck 42 which surrounds the socket 35 and in which the latter is secured. An outwardly projecting flange 43 forms part of the socket 35 and this flange 43 is in contact with the upper part of the jacket 40. By its own elastic function, the jacket 40 has pressed therein, the rotatable socket 35 with its flange 43 which at its top has the flange 36 of the bearing member 33 provided thereon. Also, the base member 37 is pressed against the ball member 34 and thereby the member 37 and the ball member 34 will be maintained in contact with each other when the entire stand is lifted. The middle point 43′ of the partial ball and socket joint 34 and 38, that is the radial middle point for the outer surface of the ball member 34 and the seat surface 39. The sliding surfaces for the ball member 34 and the semi-socket member 38 are protected by the jacket 40 against the entry of foreign matter with the bottom 44 of the socket 38 entirely closed.

The use and operation of the structure of FIGURE 4 is essentially the same as the operation of the first modification whereby also the same advantages are achieved as to stabilization for the optical axis as to the optical instrument mounted thereon, such as a camera. The ball and socket joint 34 and 38 will provide a free movement and dampened rotary movement for the leg around its longitudinal axis and also dampened swinging motion is possible for the lateral movement of the leg in every direction. During this adjustment the foot portion 116 will remain stationary on the floor 29 or any supporting surface. Upon lateral movement of the leg 10 from its vertical axis relative to the surface 29, the rubber cover 40 will attain a certain deformation as to its upper part, but this deformation is held to a minimum since the center point 43′ of the ball and socket joint 34 and 38 are practically in a plane in which the upper part of the jacket 40 and the flange 43 of the socket 35 are in contact with each other. Upon the lateral movement of the leg 10 by a stationary foot 116, the jacket 40 will undergo a deformation as to its elastic function which is endeavored to take place to again straighten up the leg 10 or upon lifting of the stand from the surface 29, the foot 116 relative to its leg 10 will return to its coaxial position.

FIGURE 6 illustrates a third modification of a single leg support and is differentiated from the other two described constructions thereby that at its upper end of the leg 10, a rotatable connection 45 is provided to which the telescoping leg part 12 is secured to the plate 46 and an upper plate 47 is mounted coaxial with the leg 10. The threaded pin 14 receives the optical instrument which seats on the plate 47 and the latter plate is rotatable on the plate 46 and is provided with a friction device 48 of felt or artificial material secured between the plates to thus dampen the rotary movement of the instrument on the plate 47.

The foot 216 is composed of a comparatively flat supporting bell-shaped member 49 having a bottom peripheral rim 50 with a rubber or similar material cover bead 51 thereon. This bead 51 will strengthen the support. Between the foot 216 and the lower end of the leg 10, there is provided a cross linkage 52 as a universal joint which is composed of the parts 53 which is a projecting lug 54, which is a double fork-shaped member and 55 which is another projecting lug. The lower lug 53 is secured by a threaded pin 56 into the upper part of the bell-shaped member 49 whereas the upper link 55 is secured to the telescoping leg part 11 of the leg 10 by any desired securing means. The middle double work link 54 of the cross linkage 52 is connected by two pin bolts 57 and 58 at right angles relative to each other to interconnect the lugs 53 and 55. In this way it is possible to adjust the leg 10 relative to the foot 216 in any direction out of the vertical position but it cannot be rotated.

If now the foot 216 is set on the surface 29 then the leg and the foot cannot be rotated in any practical manner and in particular the leg 10 is not subject to rotation relative to the surface 29. The optical axis of an optical instrument mounted on the plate 47 can only be rotated in a horizontal plane by the relative rotation of the plates 47 and 46 with the friction resistance means 48 between the plates. The universal joint 52 permits the adjustment of the leg 10 without lifting the foot 216 from the surface 29. Also, it is possible to mount the foot 216 with its entire rim 51 on any surface other than horizontal and then adjust the leg 10 so that it will be vertical due to the universal joint 52.

The cone-shaped supporting bell 49 is secured to the universal joint 52 by means of the screw-threaded pin 56 which latter is a part of the universal joint.

In all the various described modifications one can provide the rubber rims 19, 51 and 41 with projecting portions and cut in parts to thus profile the rims, in order to minimize the sliding of the foot on a surface such as snow and ice.

In place of the supporting bell 17 and 49 of the first and third modifications, it is also possible to provide a star-shaped support with at least three radially arranged arms which at their outer ends are provided with a rubber part or the like to form a means to prevent sliding on a floor, road, pavement, and the like.

The arms of the support means may also be made so that they can be folded together.

In the form of construction according to FIGURE 7, there is disclosed a leg having a foot portion 316 interconnected by a threaded pin 25 and the two parts of the leg 10 as telescoping parts 11 and 12 so that the foot 316 and the leg 10 are not rotatable. The foot 316 consists of a single member made of a somewhat stiff but elastic part 60 which is essentially in the form of an open bell and at the bottom having an inwardly directed rim 61. The bell can be made of an artificial material, as for example, polyvinylchloride and the upper part of the bell 60 has a central knob 62 directed inwardly and having a screwthread at 63 therin. The amount of rigidity of the bell 60 is calculated in such a way that with the flange rim 61 held fast the knob 62 and therewith the foot 10 will possess practically no rotation or swing tendency. Also the bell 60 may be elastically deformable to such an extent that the leg may be bent out of its vertical position to any desired angle with the entire rim 61 of the bell remaining in contact with the surface 29.

In use as to the stand of FIGURE 7, the optical instrument may be rotated at the upper end of the leg 10. In comparison with the other described modifications, the rim 61 of the bell 60 does not have such a secure or adhesive seating on the surface 29, that a rotation of the foot 316 is not fully impossible. The rotation of the foot 316 can take place when a definite frictional resistance between the rim 61 and the surface 29 is overcome. This friction dependent on the weight of the stand and the optical instrument and also a dampened movement of the swinging movement of the optical axis in a horizontal direction is possible similar to the modified structures described heretofore, either by ball and socket structure 21 and 34, 38, or by a universal linkage 45. The elastic deformation ability of the bell 60 will permit the foot 316 to be placed on a slanting surface 29 with the entire rim 61 on such surface and still hold the leg 10 in a vertical position. Upon lifting the stand from the surface 29, the foot 316 will assume a coaxial position with the leg due to the elastic property of the foot 316.

In all the various forms of the stand it is possible to provide also a sloping or bent head structure. Also, is possible in the forms of construction of FIGURES 1 to 6, to provide a device of known construction, for dynamic rotary speed dempening between the upper part of the stand and the optical instrument, as for example centrifugal mass or a fluid brake which was only possible for use heretofore with tripods. Such dampening devices are used for swinging a camera slowly for panorama picture-taking, with the optical instrument having such a small stored force that the joint 21 and 34, 38 and 45 of the stand will remain rigid by friction. Quick movement does not permit the dampening device to function and if one sought out a quick movement by large force expenditure, then the rotation in the joint 21 and 34, 38 and 45 will result. The mentioned dampening devices can be applied and built into the stand and also combined with the rotary device 45.

It is clear that the described stands are not limited for use with film cameras but they can also be used with success for other optical instruments, as for instance, photo apparatus, telescopes, etc.

The invention is not necessarily limited to a one leg stand, but can, if desired, also be applied to three-legged stands. It is only thus necessary that one of the legs for the stand shall be provided with the improved foot structure. If the two other legs are to be folded together, the stand can then use a single stand leg. The application of a usual three-legged stand is further possible. In a three-legged stand it is also possible to use a middle column, which according to the invention will have a foot structure, so that the stand, upon folding together the legs and the middle column may be pulled out similar to a single leg stand, all according to the invention.

I claim:

1. A stand for carrying an optical instrument, particularly a film camera, comprising a rigid leg member, connecting means provided at the top of said leg member and adapted to connect said leg member with an optical instrument so that the latter is prevented from angular movement with respect to the top of said leg member about the longitudinal axis thereof, a foot member secured to the lower end of the leg member, said foot member having bearing surface portions for contacting a supporting surface on which the stand is set up, a joint inserted between said leg member and said foot member adapted to allow a tilting movement of said leg member relative to said foot member in any desired direction, and friction means arranged between said supporting surface and said connecting means to brake said optical instrument against unintentional angular movement with respect to the supporting surface about the longitudinal axis of said leg member.

2. A stand according to claim 1, wherein said joint and said friction means are united forming a ball bearing device having a partial ball member with a partially spherical surface and a friction bearing member with a hollow partly spherical bearing surface in frictional contact with said ball member, and in which means are provided for pressing said ball member and said bearing member against one another to produce a braking friction action therebetween.

3. A stand according to claim 2, wherein said ball member is secured to the lower end of said leg member and said bearing member is a portion of said foot member.

4. A stand according to claim 2, wherein the foot member is provided with means adapted to prevent the entry of foreign matter between said bearing member and said ball member.

5. A stand according to claim 2, wherein said ball member is fixedly secured to the lower end of said leg member through an intermediate shank member, said bearing member being a portion of said foot member and being constituted by a rigid bell-shaped body having a depressed upper end portion, the outer side of which has said hollow spherical bearing surface, and in which said foot member comprises a rubber elastic bell-shaped jacket surrounding said ball member and said bearing member and having an open lower end and an upper end, said jacket having at its lower end an inwardly projecting rim flange engaging a bottom edge of said body, the upper end of said jacket being rotatably connected to said intermediate shank, and said rim flange having said bearing surface portions.

6. A stand according to claim 5, wherein a sleeve is rotatably mounted on said intermediate shank member, said sleeve having a lower end with an outwardly projecting flange, said upper end of said jacket being secured to said sleeve above said outwardly projecting flange.

7. A stand according to claim 5, wherein said partially spherical surface of said ball member has a center of curvature lying within said intermediate shank member on a longitudinal axis thereof and adjacent the upper end of said jacket.

8. A stand according to claim 1, wherein said foot member is fixedly non-rotatably secured to the lower end of said leg member, said friction means being arranged at a location between said foot member and said connecting means, and said joint being a Cardan-joint.

9. A stand according to claim 1, wherein said foot member is constituted by a bell-shaped elastically deformable member having a closed upper end portion and an open bottom end, said upper end portion being secured to the lower end of said leg member, said bearing surface portions being provided at said bottom end of said deformable member, said joint being constituted by said deformable member, which is deflectable for allowing a tilting movement of the leg member with respect to said bottom end, and said deformable member being sufficiently rigid to prevent any rocking and oscillatory movement of said upper end portion relative to said lower end thereof about the longitudinal axis of said leg member.

10. A stand according to claim 9, wherein said upper end portion of said deformable member is fixedly and non-rotatably secured to the lower end of said leg member, said friction means being constituted by an annular rim of said lower end of the deformable member, said rim being provided with said bearing surface portions which are frictionally rotatable with respect to said supporting surface on which the stand is set up.

11. A stand according to claim 9, wherein said deformable member is fixedly and non-rotatably secured to the lower end of said leg member, said friction means being arranged between said deformable member and said connecting means, and wherein said friction means provides a desired damped angular movement of said connecting means and the optical instrument mounted thereone with respect to said deformable member about the longitudinal axis of said leg member.

References Cited

UNITED STATES PATENTS

| 401,380 | 4/1889 | Sammons | 248—188.9 |
| 769,447 | 9/1904 | McKinney | 248—188.5 X |
| 883,811 | 4/1908 | Kraus | 248—160 |
| 1,276,666 | 8/1918 | Lohmann | 248—188.8 X |
| 1,337,947 | 4/1920 | O'Toole | 248—160 X |
| 1,463,217 | 7/1923 | Kristofek | 248—158 |
| 1,698,388 | 1/1929 | Brown | 248—127 |
| 1,911,636 | 5/1933 | Meitzler | 248—160 X |
| 2,056,957 | 10/1936 | Colbridge | 248—188.9 |
| 2,284,770 | 6/1942 | Scheuer | 248—158 |
| 2,753,586 | 7/1956 | Metz | 16—18 |

JOHN PETO, *Primary Examiner.*